United States Patent
Bichot et al.

(10) Patent No.: US 7,418,527 B2
(45) Date of Patent: Aug. 26, 2008

(54) METHOD AND DEVICE FOR IDENTIFYING DEVICES CONNECTED TO A COMMUNICATION NETWORK

(75) Inventors: Guillaume Bichot, La Chapelle Chaussee (FR); Nicolas Burdin, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 10/485,794

(22) PCT Filed: Jul. 30, 2002

(86) PCT No.: PCT/FR02/02724

§ 371 (c)(1),
(2), (4) Date: Feb. 4, 2004

(87) PCT Pub. No.: WO03/014941

PCT Pub. Date: Feb. 20, 2003

(65) Prior Publication Data

US 2004/0243733 A1    Dec. 2, 2004

(30) Foreign Application Priority Data

Aug. 10, 2001   (FR)   .................................. 01 10697

(51) Int. Cl.
*G06F 13/00*   (2006.01)
*H04L 29/12*   (2006.01)
*H04L 12/64*   (2006.01)

(52) U.S. Cl. .............................. 710/10; 710/9; 710/104

(58) Field of Classification Search ..................... 710/9, 710/10, 104; 340/825.52; 379/246; 370/254; 709/253; 713/100

See application file for complete search history.

(56) References Cited

U.S. PATENT DOCUMENTS

| 5,952,934 | A  | * | 9/1999 | Matsumoto et al. | ..... 340/825.52 |
| 6,157,633 | A  | * | 12/2000 | Wright | ....................... 370/349 |
| 6,260,120 | B1 | * | 7/2001 | Blumenau et al. | ........... 711/152 |
| 6,286,067 | B1 | * | 9/2001 | James et al. | ................. 710/104 |
| 6,374,316 | B1 | * | 4/2002 | James et al. | ................. 710/104 |
| 6,502,158 | B1 | * | 12/2002 | James et al. | ................. 710/311 |

FOREIGN PATENT DOCUMENTS

EP    961453    12/1999
WO   01/22721   3/2001

OTHER PUBLICATIONS

"Computation of switching noise in printed circuit boards" by Yook et al. (abstract only) Publication Date: Mar. 1997.*
Search report dated Apr. 11, 2003.

* cited by examiner

*Primary Examiner*—Gopal C. Ray
(74) *Attorney, Agent, or Firm*—Joseph J. Laks; Paul P. Kiel

(57) ABSTRACT

The invention concerns a device in a communication network, the device comprising a component for obtaining a permanent identifier of the devices connected to the network and a component for establishing an association table between the permanent identifier of a device and a temporary identifier of the device in the network. The component for establishing the association table is adapted to read the permanent identifier of a device, the reading sequence of the permanent identifiers on the devices being based on a parameter pertaining to the device performing the reading. The invention also concerns a corresponding method.

12 Claims, 4 Drawing Sheets

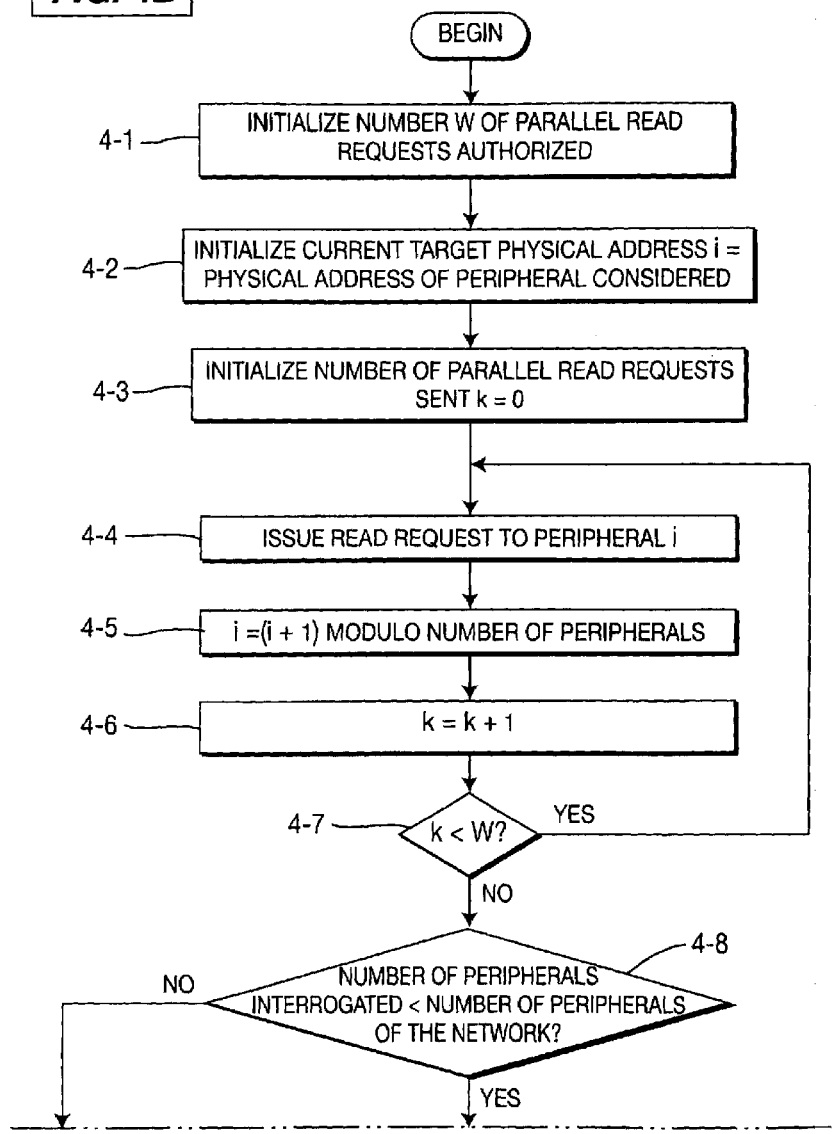

METHOD AND DEVICE FOR IDENTIFYING DEVICES CONNECTED TO A COMMUNICATION NETWORK

This application claims the benefit, under 35 U.S.C. §365 of International Application PCT/FR02/02724, filed Jul. 30, 2002, which was published in accordance with PCT Article 21(2) on Feb. 20, 2003 in French and which claims the benefit of French patent application No. 0110697, filed Aug. 10, 2001.

The present invention relates to communication networks, more particularly to a process for identifying peripherals connected to this network after a reinitialization of the network, and to the device for implementing the process.

The IEEE 1394 bus, defined in the document "IEEE 1394-1995 Standard for a High Performance Serial Bus", is a serial bus for digital transmissions allowing the connection of devices referred to hereinafter as peripherals. Each of these interconnected peripherals possesses a physical address which can change after a change of configuration of the network (connection of a new peripheral to the network, disconnection of a peripheral from the network, etc.) and a static address referred to as EUI-64 stored permanently in memory read-accessible by any other peripheral. After any change of configuration of the network, the latter proceeds automatically to an auto-reconfiguration (following a reinitialization of the bus referred to as a "bus reset"), which involves renumbering of the physical addresses of the peripherals present on the network. This renumbering is straightforward since each peripheral is numbered by a distinct number between zero and the number of peripherals present on the network. At the end of the reconfiguration procedure each peripheral knows its own physical address and the number of peripherals connected to the network.

However, according to the above reconfiguration procedure, the physical addresses are not permanent, so that a means of uniquely and permanently identifying a peripheral is to use the EUI-64 static address of the corresponding peripheral. This address is unique and permanent, and present in a very special register of the configuration ROM of each peripheral of the network.

In order to communicate with the other peripherals, a given peripheral therefore needs to read the EUI-64 static addresses of the surrounding peripherals (then considered to be target peripherals by the given peripheral for the reading of the identifiers) connected to the IEEE1394 network. It can subsequently keep internally the association between the physical address and the EUI-64 static address of the peripherals with which it has already communicated so as to speed up future exchanges of information with these various peripherals.

FIG. 1 is a flow chart presenting a process of discovery of the surrounding network by a given peripheral after the reconfiguration of the network (following a reinitialization of the bus). FIG. 1 presents a process, known to the person skilled in the art, for reconstructing an internal table of association of a given peripheral giving the EUI-64 static address of all the other peripherals connected to the network.

The process is considered for any peripheral of the network envisaged. This peripheral will explore the network to find the EUI-64 bit addresses of the surrounding peripherals whose physical addresses it knows since the latter go from zero to the number of peripherals minus one. The peripheral considered will therefore read the EUI-64 static addresses of the surrounding peripherals (1-2) starting from the peripheral having the physical address equal to zero (1-1) and associate them internally in a table with the physical address of the target peripheral considered (1-3). The peripheral considered will then pass to the peripheral of immediately following physical address (1-4) so long as peripherals for which it has not made the association (1-5) still remain in the network.

The problem resides in the fact that all the peripherals of the network will use the same algorithm, so many peripherals will simultaneously attempt to read the configuration ROM of one and the same peripheral. The ROM of a peripheral processes only one request at a time, hence if the peripheral is busy with a read request, the subsequent read requests will accumulate in one or more stacks, this signifying that there may be risks of overflow of these stacks and hence loss of read requests. On the other hand, even if the peripheral possesses sufficiently large stacks, seeing as each peripheral possesses a limited time for responding to a request, if the peripheral is overloaded with requests it may exceed this deadline and hence not be able to respond.

Thus, the present invention relates to a process for identifying the peripherals connected to a network where each peripheral is distinguished by a permanent unique identifier and by a physical address, and where each peripheral seeks to associate internally the physical address and the identifier for each of the peripherals connected to the network, characterized in that the order of exploration of the other peripherals by a given peripheral is dependent on a parameter specific to the given peripheral. The use of the specific parameter allows a variable factor to be introduced into the order of traversal of the network at the level of the read requests.

According to an improvement, the physical parameter specific to each peripheral of the network is its physical address in the network.

According to an improvement, each peripheral connected to the network commences its exploration of the network with itself, that is to say by considering itself to be the first target peripheral for the sending of its requests to read the identifier.

According to another improvement, the exploration of the network by each peripheral is done according to the order of the numbering of the physical addresses of the various peripherals connected to the network. According to a variant the exploration of the network by each peripheral is done according to a random order of the numbering of the physical addresses of the various peripherals connected to the network.

According to another improvement, each peripheral connected to the network sends in parallel several read requests to different target peripherals without waiting for the response of one peripheral before sending a request to the next peripheral.

The subject of the present invention is also a device for connection to a communication network, the said device comprising means for obtaining a permanent identifier of the devices connected to the network and means for compiling a table of association between the permanent identifier of a device and a temporary identifier of that device in the network, characterized in that the means for compiling the table of association are able to perform a reading of the permanent identifier of a device, the order of reading of the permanent identifiers at the devices being dependent on a parameter specific to the device performing the reading.

Other characteristics and advantages of the present invention will become apparent on reading the description of various modes of practice, this description being given with reference to the appended drawings, in which.

Figure 1:
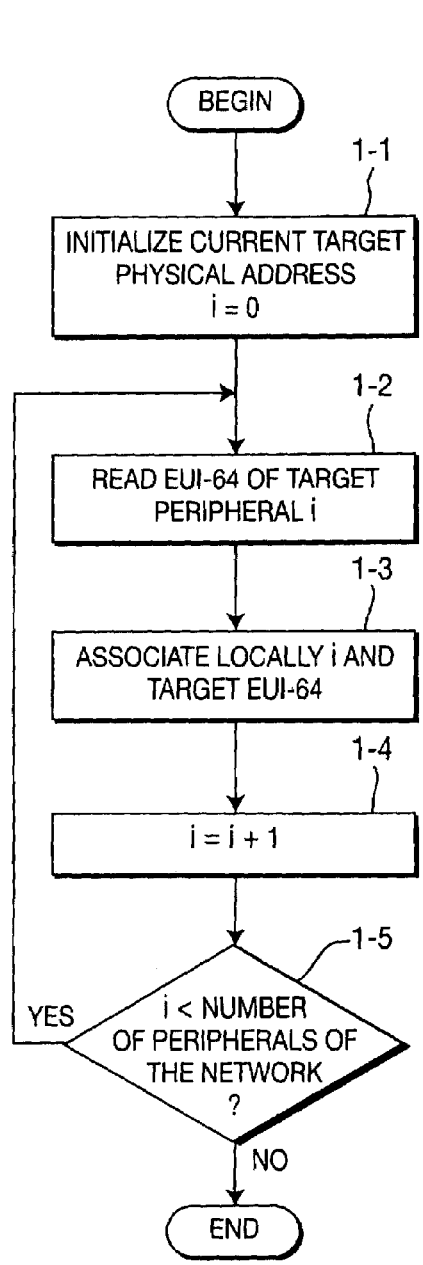
FIG. 1 is a flowchart representing the topological discovery of a network according to the prior art.
Figure 2:
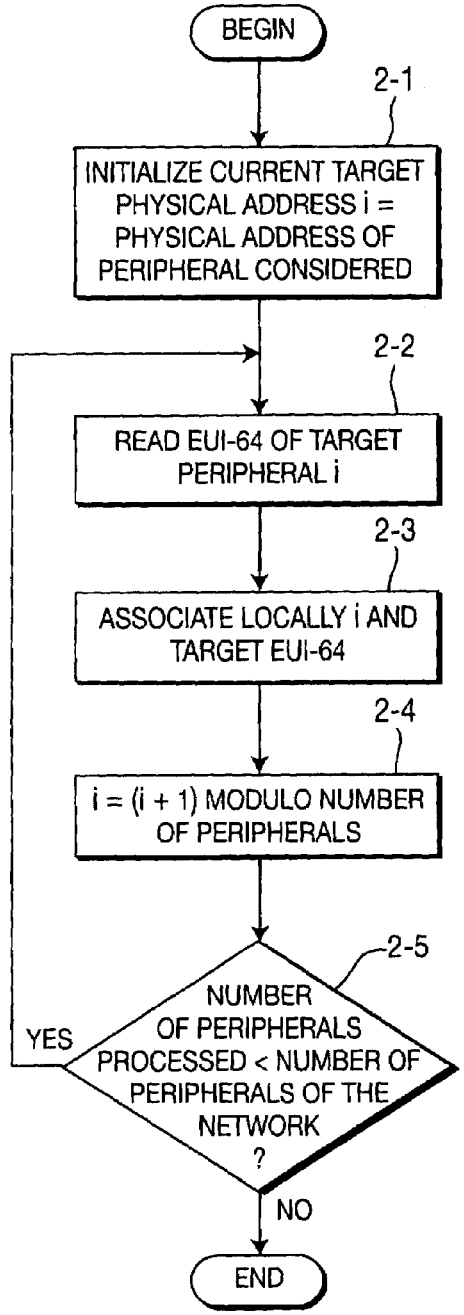
FIGS. 2 and 3 are flowcharts showing various modes of practice of the present invention based on the order of traversal but without request in parallel.

A particular mode of practice of a process of topological discovery of a network comprising a set of n interlinked peripherals, where each peripheral is distinguished by a unique permanent identifier and by a physical address, and where each peripheral seeks to associate internally the physical address and the identifier for each of the peripherals connected to the network, characterized in that the exploration of the other peripherals by a given peripheral is dependent on the physical address of the given peripheral will now be described with reference to FIG. 2.

FIG. 2 is a flowchart presenting a process of topological discovery of an IEEE1394 network for which the unique and permanent identifier of each peripheral is the EUI-64 static address, and where the exploration of the network by each peripheral commences with itself and is done according to the order of the numbering of the physical addresses of the various peripherals connected to the network. The person skilled in the art can, of course, use any other identifier to designate a given peripheral. The use of the EUI-64 static address is certainly not the only way in which to identify a peripheral: it is also possible to use the serial number of this peripheral's configuration ROM or any other identifier. The process is considered for any peripheral of the network envisaged. This peripheral will explore the network to find the EUI-64 static addresses of the surrounding peripherals whose physical addresses it knows since the latter go from zero to the number of peripherals minus one. The peripheral considered will therefore read the EUI-64 static address of the first target peripheral (2-2), that is to say of itself (2-1), and associate it internally in a table with the physical address of the target peripheral considered (2-3). The current target peripheral will thereafter become the peripheral of immediately following physical address modulo the number of peripherals connected to the network (2-4) so long as peripherals for which it has not made the association (2-5) still remain in the network.

The present invention limits the number of collisions and hence the overloading of the requests at the level of the ROMs of the target peripherals. Specifically, the shift system established by the use of mutually distinct initial target physical addresses and passing on to the next target peripheral by an increment of one unit in the physical address of the current target peripheral make it possible to equitably distribute the requests among all the peripherals present on the network.

Moreover, to increase the efficiency of discovery of the network, it would be beneficial for a given peripheral to be able to issue several requests in parallel to various target peripherals (that is to say to issue several read requests without having to wait for the response of the target peripherals) instead of doing it peripheral by peripheral. This is not possible with the process presented in FIG. 2.

Figure 3:
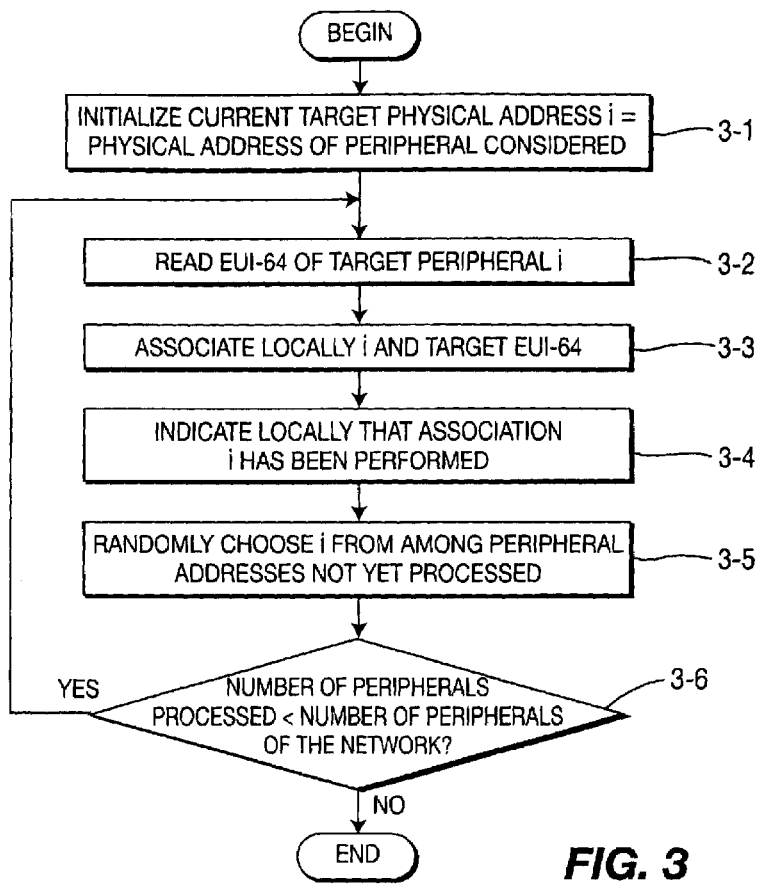

Represented in FIG. 3 is a variant of the present invention where the exploration of the network by each peripheral is done according to a random order of the numbering of the physical address of the various peripherals connected to the network. Specifically, the mode of practice described above was based on a pre-established order of traversal of the various peripherals of the network whereas it is possible to consider that each peripheral traverses the network according to a specific random order of its own. However, each peripheral connected to the network always commences its exploration of the network with itself, that is to say by considering itself to be the first target peripheral for the sending of its requests to read the identifier. The process is considered for any peripheral of the network envisaged. This peripheral will explore the network to find the EUI-64 static address of the surrounding peripherals whose physical addresses it knows since the latter go from zero to the number of peripherals minus one. The peripheral considered will therefore read the EUI-64 static address of the first target peripheral (3-2), that is to say of itself (3-1), and associate it internally in a table with the physical address of the target peripheral considered (3-3). The peripheral considered will thereafter mark internally, for example in an array, the peripheral that it has just processed (3-4). Thereafter it changes current target peripheral: the physical address of the new current target peripheral is chosen randomly from among the physical addresses of the peripherals that have not yet been associated (3-5), indicated by virtue of the array, for example. As long as peripherals for which the peripheral considered has not made the association (3-6) still remain in the network, it will repeat the steps starting from the reading of the EUI-64 static address for the new current target peripheral.

The variant of the present invention presented by FIG. 3 limits the number of collisions and hence the overloading of the requests at the level of the ROMs of the target peripherals. Specifically, if a large number of peripherals is connected to the network, the probability of two peripherals simultaneously interrogating one and the same third peripheral depends on the random functions used for choosing the target peripherals. If a different random function is chosen for each peripheral or one and the same random function initialized with different values according to each peripheral, for example their physical address, is chosen, the probability of collision is thereby limited.

It is then conceivable for each peripheral to possess a random generator or for there to be a random generator common to all the peripherals which will create a list, arranged randomly, of the physical addresses of the various peripherals, and for each peripheral to traverse this common list, commencing at different places, in this case, a pre-established order of traversal is again found. For example, a given peripheral commences traversing the network starting from the target peripheral of physical address corresponding to the element in the list whose number is its own physical address.

Figure 4B:
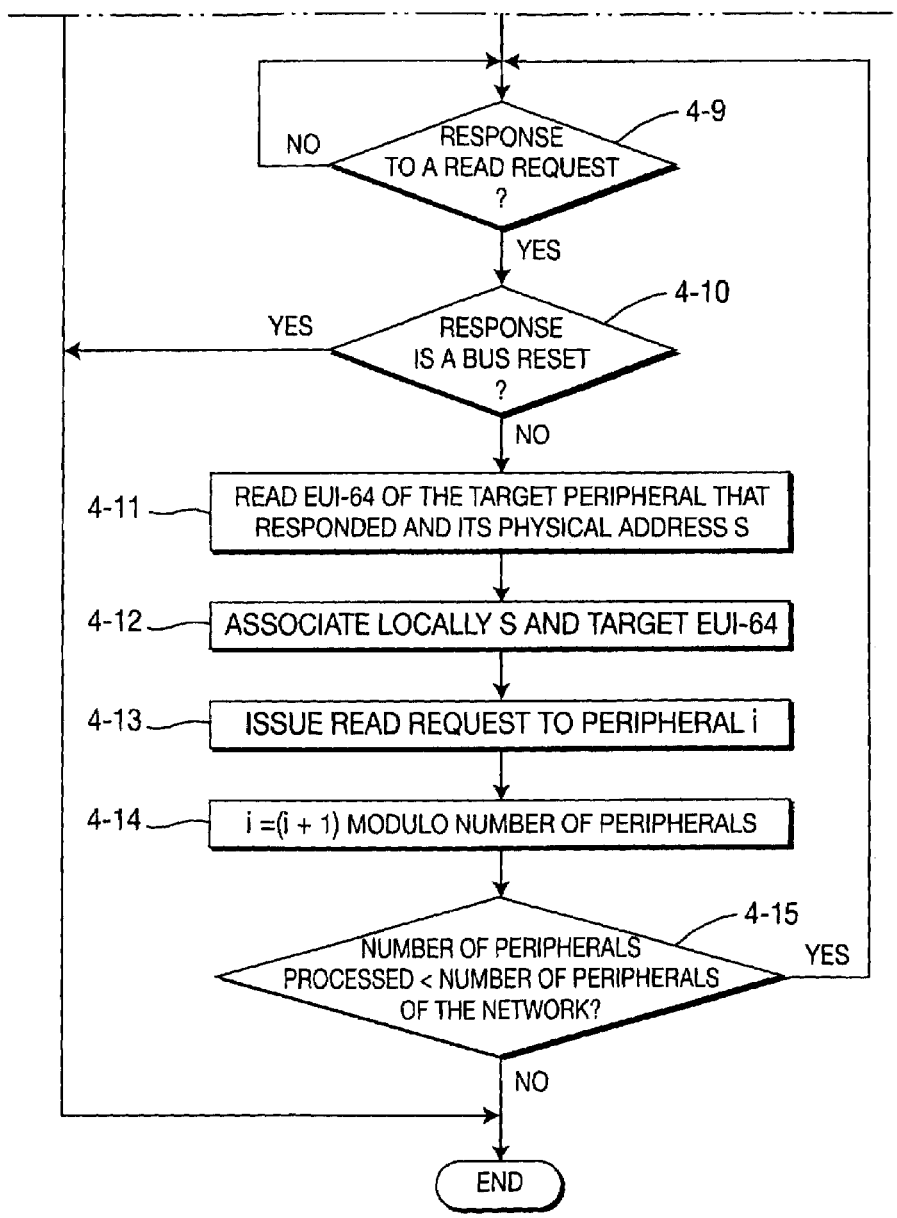
FIG. 4 shows a flowchart of a preferred mode of practice of the present invention based on the order of traversal and the sending of requests in parallel.

FIG. 4 is a flowchart which presents a possible improvement of the present invention since it allows the various peripherals of the network to issue, in one and the same time span, a certain number of requests to read in parallel, that is to say that a given peripheral does not need to wait for the response of one target peripheral before sending a read request to the next target peripheral. All the same, it is necessary to limit the number of possible requests to read in parallel so as not to overload the network. The maximum number of requests to read in parallel is for example a constant which reflects the processing capabilities of the network itself, for example this constant depends on the size of the stacks or of the buffer memories and should be fixed at the beginning of the association phase (4-1). The improvement presented by FIG. 4 is made to the principle set forth in FIG. 2: the exploration of the network by each peripheral commences with itself (4-2) and is done according to the order of the numbering of the physical addresses of the various peripherals connected to the network (4-5). The peripheral considered will therefore send in parallel as many read requests as it is authorized to send (4-3, 4-6, 4-7), without waiting for the responses of the target peripherals to which it has sent these requests before passing to the next target peripheral. Just as for the invention represented in FIG. 2, the passing from one target peripheral to the next target peripheral is done by increment of the physical address of the current target peripheral by one unit modulo the number of peripherals connected to the network (4-5). The peripheral considered thereafter waits for a response to the requests that it has sent previously (4-9). If the peripheral receives a network reconfiguration order (bus reset) (4-10), then the peripheral recommences the exploration of the network. If the peripheral considered receives a response containing an identifier, such as the EUI-64 static address used hitherto, it then internally associates the physical address of the peripheral which has responded to it and the EUI-64 static address received (4-12). Thereafter, as long as the number of peripherals interrogated by a request is strictly less than the number of peripherals connected to the network (4-15), it issues a new read request to the current target peripheral (4-13) and it increments the current address of the target peripheral (4-14).

The improvement of the present invention presented in FIG. 4 possesses the same advantages as the process presented in FIG. 2 since they are both based on the same principle of shifting in respect of the addresses of the target peripherals. This therefore reduces the number of collisions and avoids the overloading of the configuration ROMs of the peripherals. Moreover, the possibility of sending several read requests in parallel allows the peripherals to reduce the waiting times for the responses to these requests. Specifically, if one peripheral is slow to respond, it can process the response of a faster peripheral which was interrogated after the slower one and thus improve the efficiency of the exploration.

A method similar to the second variant of the invention presented in FIG. 3 can be applied. Specifically, the possibility of issuing requests to read in parallel is independent of the manner in which the network is traversed. Instead of being traversed in the order of the numbering of the physical addresses as is done in the improvement presented in FIG. 4, it can also be traversed randomly using the process described in FIG. 3.

Moreover, a process of sending requests in parallel applies also in the case where, as in the prior art, each peripheral uses the same order of exploration.

Figure 5:
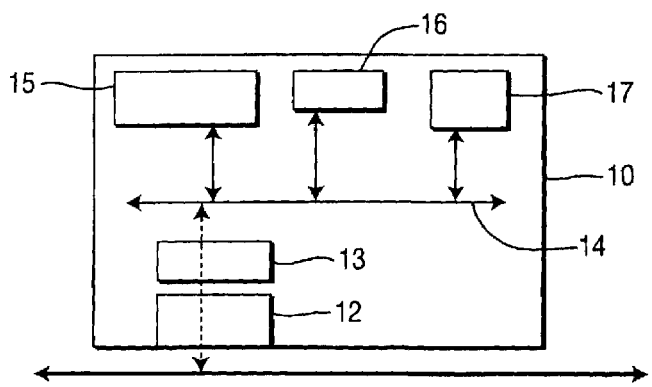
FIG. 5 is a block diagram of a peripheral capable of connecting up to the network.

FIG. 5 is a block diagram of a peripheral 10. This peripheral is, for example, an optical DVD reader. The peripheral 10 is connected to the 1394 bus bearing the reference 11 through a physical interface 12 and a linking circuit 13; the latter is linked to an internal parallel bus 14 of the peripheral 10. A microprocessor 15 or an equivalent device manages the peripheral, which comprises a circuit for managing the inputs/outputs 16 and a memory 17. These last three elements are also linked to the parallel bus 14.

Typically, the microprocessor deals with the implementation of the auto-identification process, the processes for determining the topology of the network and the processes for compiling the tables of association. The information relating to the topology after reinitialization and the tables of association are kept, for example, in the memory 17.

Modifications may, of course, be made to the process in respect of its implementation, without their departing, however, from the scope of the present invention as defined by the claims.

According to the examples given, each peripheral commences the reading of the identifier with itself. However, this is not compulsory and other initial solutions may be envisaged by the person skilled in the art: fixed shift with respect to the physical address of the peripheral considered, for example.

The invention claimed is:

1. Method for identifying devices connected to a communication network where each device is distinguished by a permanent identifier and a temporary identifier, and where at least one device seeks to associate the permanent identifier and the temporary identifier of other connected devices, the method comprising:
   determining the temporary identifiers of the devices of the network;
   reading the permanent identifiers of the devices of the network;
   associating the permanent identifier and the temporary identifier of each device;
   wherein the determining, reading and associating steps are performed by at least one device; and
   wherein the reading step is performed by successive requests at each device, the order of addressing of the requests to the devices being dependent on a parameter specific to the at least one device, so that the order of addressing is different for each of the at least one device, if at least two devices perform the reading step.

2. Method according to claim 1, wherein the parameter specific to the at least one device is the temporary identifier associated with the at least one device in the network.

3. Method according to claim 2, wherein each device connected to the network commences the reading with itself.

4. Method according claim 2, wherein the order of addressing of each device is the ascending or descending order of the temporary identifiers of the devices to be addressed.

5. Method according to claim 1, wherein the temporary identifier of a device in the network is a physical address of the device, allocated during each reinitialization of the network.

6. Method according to claim 1, wherein each device connected to the network commences the reading with itself.

7. Method for identifying devices connected to a communications network where each device is distinguished by a permanent identifier and a temporary identifier, and where at least one device seeks to associate the permanent identifier and the temporary identifier of other connected devices, the method comprising:
   determining the temporary identifiers of the devices of the network;
   reading the permanent identifiers of the devices of the network;
   associating the permanent identifier and the temporary identifier of each device;
   wherein the reading step is performed by successive requests at each device, the order of addressing of the requests to thr devices being dependent on a parameter specific to the at least one device,
   wherein the parameter specific to the at least one device is the temporary identifier associated with the at least one device in the network, and
   wherein, following a change of configuration of the network, each device connected to the network performs the following steps:
   (a) initializing the destination address of a target device whose permanent identifier is to be read with the temporary identifier of the device performing the reading;
   (b) reading the identifier of the target device;
   (c) associating, at the level of the device performing the reading, the permanent identifier and the temporary identifier of the target device;
   (d) incrementing, respectively decrementing, the destination address, modulo the number of appliances in the network and repeating steps (b) to (d) until all the permanent identifiers are obtained.

8. Method for identifying devices connected to a communication network where each device is distinguished by a permanent identifier and a temporary identifier, and where at least one device seeks to associate the permanent identifier and the temporary identifier of other connected devices, the method comprising;

determining the temporary identifiers of the devices of the network;

reading the permanent identifiers of the devices of the network;

associating the permanent identifier and the temporary identifier of each device; wherein the reading step is performed by successive requests at each device, the order of addressing of the requests to the devices being dependent on a parameter specific to the at least one device, wherein the parameter specific to the at least one device is the temporary identifier associated with the at least one device in the network, and wherein the at least one device chooses the devices to be read in a random or pseudorandom order, the seed to generate the random or pseudorandom order case being the specific parameter.

9. Method for identifying devices connected to a communication network where each device is distinguished by a permanent identifier and a temporary identifier, and where at least one device seeks to associate the permanent identifier and the temporary identifier of other connected devices, the method comprising:

determining the temporary identifiers of the devices of the network;

reading the permanent identifiers of the devices of the network;

associating the permanent identifier and the temporary identifier of each device;

wherein the determining, reading and associating steps are performed by at least one device; and wherein the reading step is performed by successive requests at each device, the order of addressing of the requests to the devices being dependent on a parameter specific to the at least one device, and wherein the at least one device sends the successive requests, without waiting for the response of a particular device before sending a next request.

10. Method for identifying devices connected to a communication network where each device is distinguished by a permanent identifier and a temporary identifier, and where at least one device seeks to associate the permanent identifier and the temporary identifier of oilier connected devices, the method comprising:

determining the temporary identifiers of the devices of the network;

reading the permanent identifiers of the devices of the network;

associating the permanent identifier and the temporary identifier of each device;

wherein the determining, reading and associating steps are performed by at least one device; and wherein the reading step is performed by successive requests at each device, the order of addressing of the requests to the devices being dependent on a parameter specific to the at least one device, and wherein the permanent identifier of a device is the EUI-64 value.

11. Device for connection to a communication network, the device comprising:

means for obtaining a permanent identifier of the devices connected to the network and;

means for compiling a table of association between the permanent identifier of a device and a temporary identifier of that device in the network, wherein the means for compiling the table of association includes means to perform a reading of the permanent identifier of a device, wherein an order of reading of the permanent identifiers at the devices is dependent on a parameter specific to the device performing the reading.

12. Device according to claim 11, wherein the specific parameter is a physical address of the device in the network.

* * * * *